July 28, 1964 H. H. W. QUENZLER 3,142,457
STALL PATTERN LIFT REGULATOR FOR AIRPLANES
Filed July 16, 1962 3 Sheets-Sheet 1

INVENTOR.
HENRY H. W. QUENZLER
BY
Reynolds & Christensen
ATTORNEYS

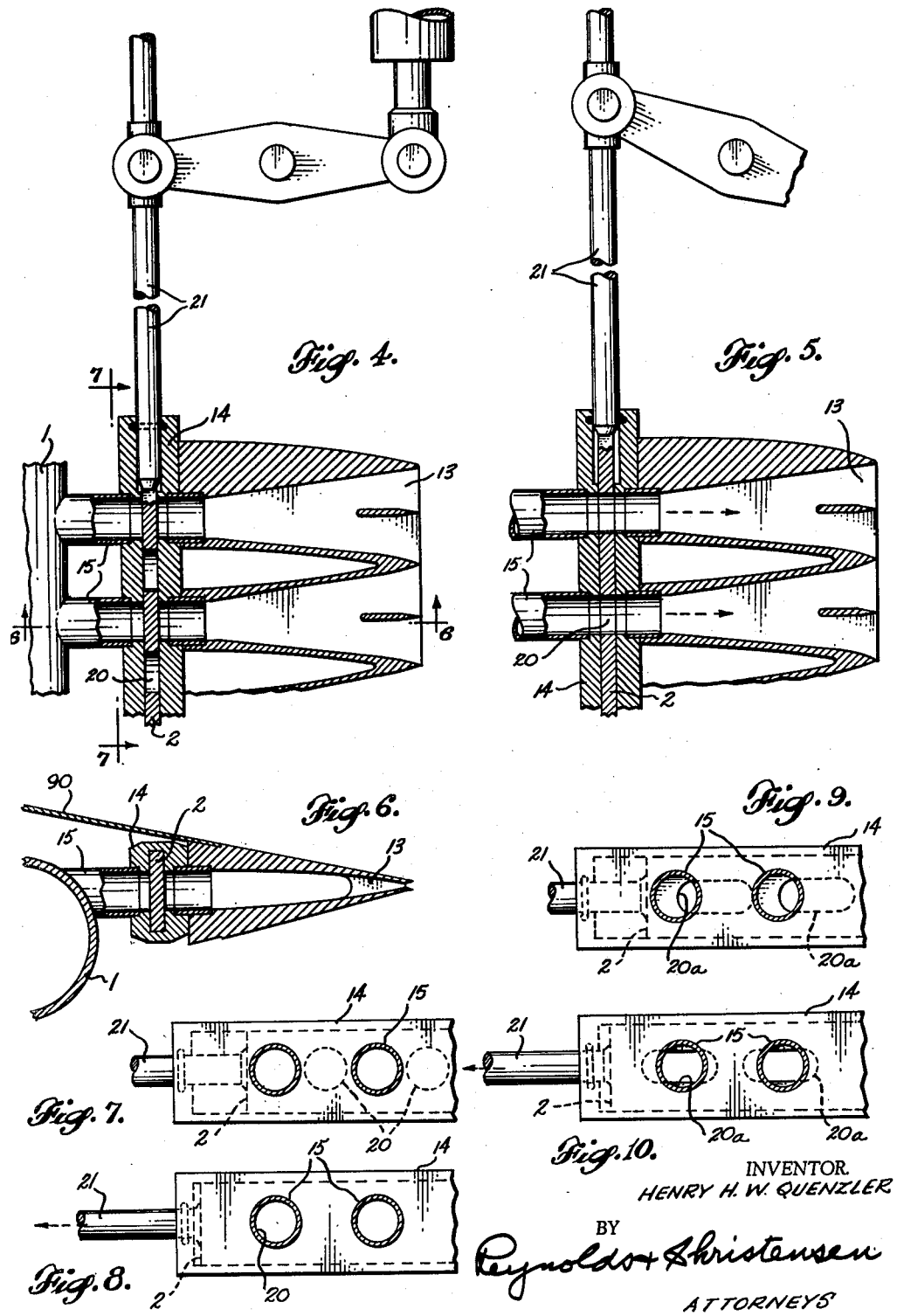

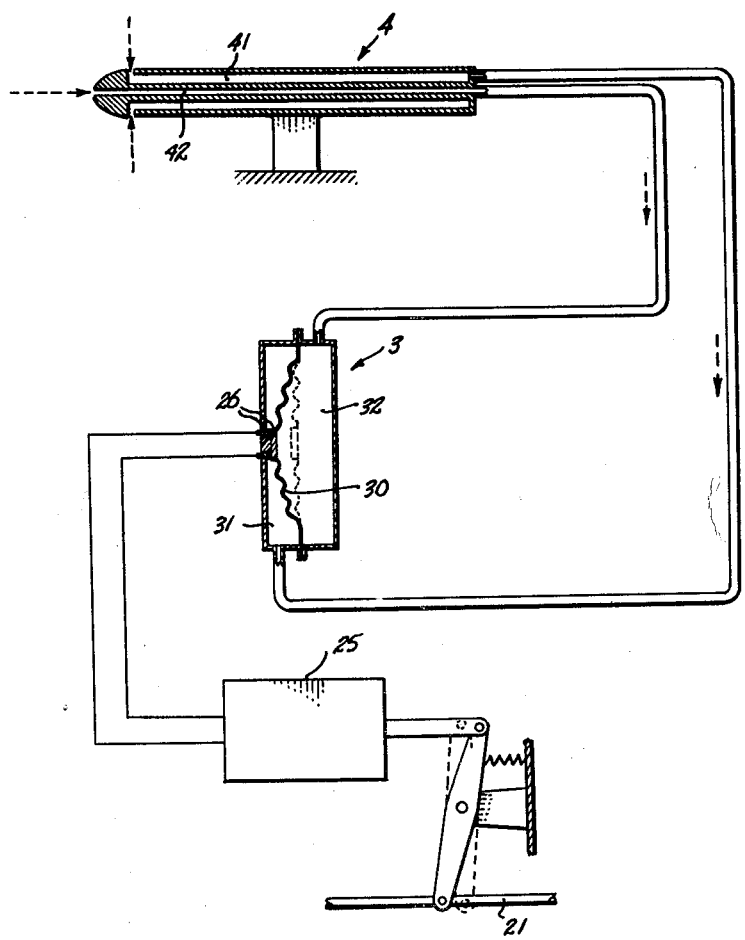

United States Patent Office 3,142,457
Patented July 28, 1964

3,142,457
STALL PATTERN LIFT REGULATOR FOR AIRPLANES
Henry H. W. Quenzler, Seattle, Wash., assignor to The Boeing Company, Seattle, Wash., a corporation of Delaware
Filed July 16, 1962, Ser. No. 209,972
4 Claims. (Cl. 244—42)

This invention relates to an airplane which employs supercirculation or boundary layer control (BLC) to increase lift and decrease drag of its wings, and is concerned with automatic (or if desired, manual) modification of BLC in a particular area of a wing, and in a wing of a particular type, whenever the angle of attack and airspeed of the airplane are such as may induce stalling. The BLC is, in such circumstances, so modified, and particularly in the wing root of a swept-wing, as to decrease lift primarily ahead of but not behind the airplane's center of gravity (C.G.), and so to counter a tendency to pitch up the nose, and by lowering the nose the angle of attack is lessened, and the airspeed is automatically increased by the thrust or by the inertial forces of gravity.

This invention is especially suited for use in a swept-wing airplane which employs BLC in connection with wing tip ailerons to afford the latter extended roll control, and by differentiation in lift at the respective sides regulates the roll of the airplane. It is especially suited for use therein in that it becomes a simple matter to extend the BLC to the wing root of such a wing, and to control its use automatically, separately from the roll control. Its use is not, however, confined to airplanes so arranged, nor does this invention concern such roll control in itself.

Wings of the type to which this invention is particularly applicable are those wherein the wing tip areas or panels are primarily to the rear of the airplane's C.G., and the wing root areas or panels are primarily ahead of the C.G., and of such values that the lift of the wing tip panels and of the wing root panels are balanced to locate the center of lift substantially at the C.G. during normal flight. To effect this result the wing is materially swept back, and it is this type of wing that is meant by the term "swept-back wing," or by terms of like import, when used herein. It is a primary object of this invention to modify the lift characteristic of the wing root panel relative to the lift characteristic of the wing tip panel, during flight, or of one such panel relative to the other, to lessen the lift of the forward wing root panels relative to the lift of the rear wing tip panel or conversely, to increase the lift of the wing tip panels relative to the lift of the wing root panels, by appropriate variation of BLC air over these panels, or over one thereof, to maintain the center of lift in the vicinity of the C.G. notwithstanding a tendency, at low airspeed, for the center of lift to shift too far forward, and so to cause the wing as a whole to stall.

In particular, this invention modifies BLC either automatically or by conscious action of the pilot, and does so by mechanism of extreme simplicity, having a minimum of friction, so much so that it is capable of unassisted manual operation by the pilot, or by simple actuating means, without dependence upon any material power boost.

The invention is disclosed in the accompanying drawings in a representative form, and the principles underlying the invention will be set out in this specification, with the novel features defined in the claims.

FIGURE 4 is a horizontal sectional view through control valve devices, in closed or inoperative position, and FIGURE 5 is a like view with such devices in the open position.

FIGURE 6 is a sectional view along the line 6—6 of FIGURE 4.

FIGURE 7 is a view along the line 7—7 of FIGURE 4, with the valve devices in closed position, and FIGURE 8 is a like view, with the valve devices in open position. These two views show a form capable of simultaneous control in the opposite wings, capable of use in the stall pattern lift regulator of this invention.

Figures 1, 2, 3:
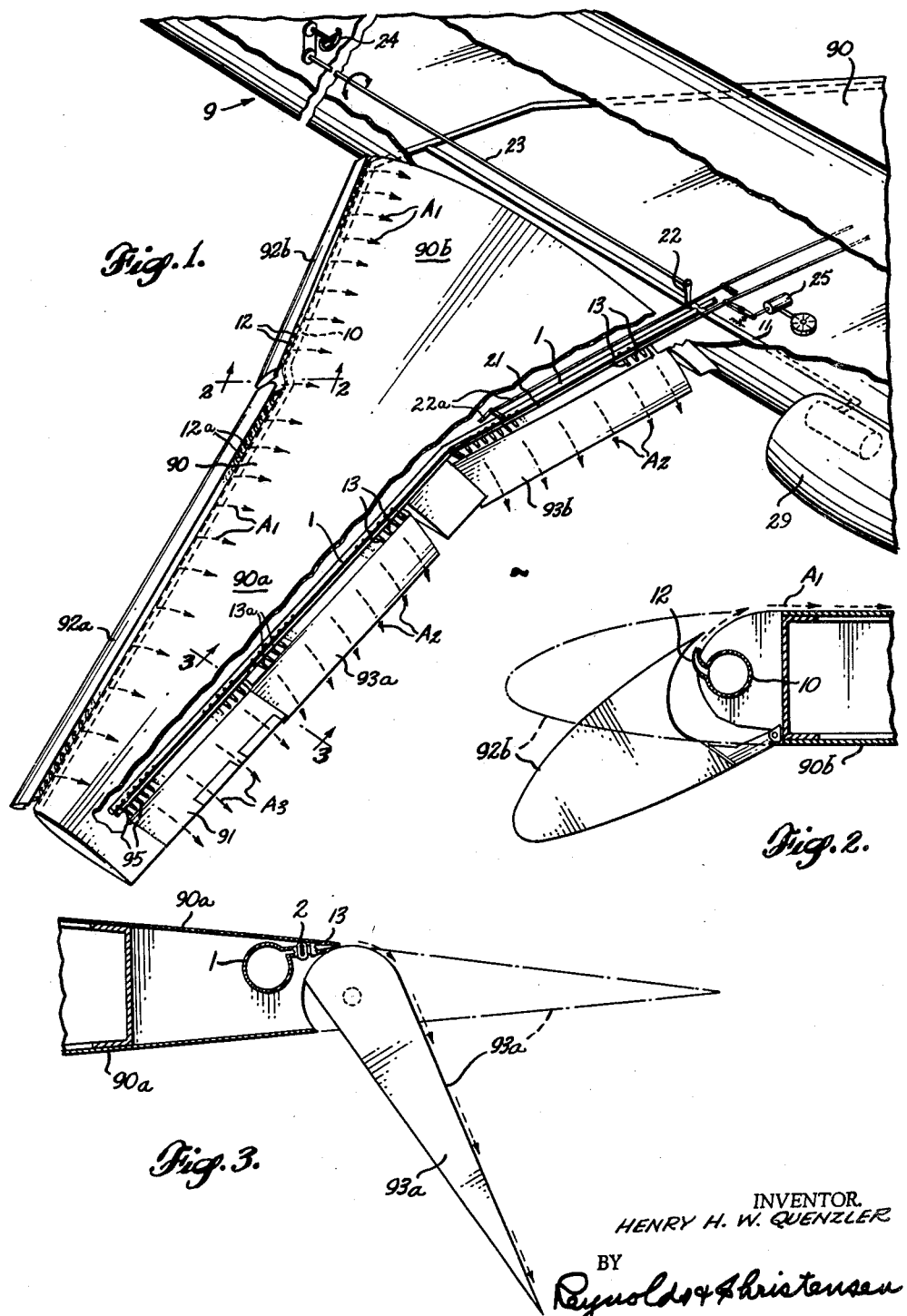
FIGURE 1 is an isometric view of one swept-back wing and part of the fuselage of an airplane equipped with the invention, and also with the roll control by means of BLC.
FIGURE 2 is a front-to-rear section through the leading edge of the airplane's wing, as indicated at line 2—2 of FIGURE 1.
FIGURE 3 is a like section of the wing's trailing edge, at the line 3—3 of FIGURE 1.

FIGURES 9 and 10 correspond closely to FIGURES 7 and 8, respectively, but show a modified form of valve devices better adapted for actuation with differential control, to effect roll control at the respective wings, hence are primarily for use with the aileron controls.

FIGURE 11 is a diagrammatic showing of a simple automatic control for modifying BLC when such is necessary.

In FIGURE 1 the airplane 9 is supported in flight by swept-back wings 90, which in the form shown have wing tip panels 90a and inboard or wing root panels 90b. Ailerons 91 are swingable in the usual way (by means not shown) for control of roll at the trailing edge of panels 90a, and one or both of leading edge flaps 92a and 92b, and trailing edge flaps 93a and 93b, are extended spanwise of the wing, except in a location where they would interfere undesirably with functioning of the ailerons, or would be swept by jet discharge from the engines, if the engines are wing-mounted. These flaps are provided for the purpose of increasing lift at any given thrust and airspeed, when they are depressed as FIGURES 1, 2 and 3 show, which would normally be at airspeeds in the lower range for any given wing.

It is known practice to provide BLC to assist the ailerons in maintaining control of rolling moments about the longitudinal roll axis. Such an installation is disclosed herein, but the BLC and its application are also herein for a different purpose, not connected with roll control. The installation includes manifolds or ducts 1 and 10, adjacent the trailing and leading edges, respectively, of the wing 90, connected (by a duct 11 for example) to a suitable source of air under pressure, which source may be conveniently the compressor section of a jet engine at 29. A suction source, in known manner, might be substituted for and located reversely to the pressure source, in known manner, although the use of a pressure source is preferred.

The air under pressure is delivered from the duct 10 by means of nozzles 12, located behind the flaps 92b and directed rearwardly over the upper skin of wing root panel 90b, and nozzles 12a, located behind the flaps 92a and also directed rearwardly over the upper skin of wing tip panel 90a, as is indicated by the arrows A1. Nozzles 13 deliver air from the duct 1 ahead of and rearwardly over flaps 93b of the wing root panel 90b, and nozzles 13a deliver air from duct 1 also ahead of and rearwardly over flaps 93a of the wing tip panel 90a, as is indicated by the arrows A2. Additional nozzles 95 may be employed to deliver air from duct 1 rearwardly over the ailerons 91, as is indicated by the arrows A3. These nozzles are not open at all times, but certain thereof are opened when control action is required or desired, as will now be explained.

The discharge from nozzles 95 is a convenient means to assist normal aileron control. It may be controlled by the same means that controls discharge from nozzles 12a and 13a, and is so shown. This discharge and cutoff at 95, at least, and at 13a and at 12a if desired, under conscious action by the pilot, in known manner produces a rolling moment, applied at one or the other of the wing tips, but not at both simultaneously. This is not part of the present invention. The discharge from nozzles 12 and 13, however, according to this invention, is separately controlled, and this control usually would be automatic, although it could be manual. The latter discharge is applied to and cut off from the two wing root panels 90b simultaneously.

The opening and closing of the several nozzles for discharge of air under pressure may be by means of a simple apertured valve plate 2 slidable with a minimum of resistance lengthwise within a valve casing 14 that is interposed between the ducts 1, 10 and the several nozzles. Two forms of valve plate are shown, and might be used alternatively. In FIGURES 7 and 8 the valve plate has circular apertures 20 cooperating with circular ports defined by the branch ducts 15; in FIGURES 9 and 10 the valve ports are elongated but narrower, and cooperate with the circular ports defined by the branch ducts 15.

Movement of the valve plate 2 for opening and closing of valves that control discharge from nozzles 12a, 13a, and 95, to produce a rolling moment by conscious action of the pilot, is effected by means such as the rod 22a, movable in the direction of its length by rocking of the rocking lever 22 with rock shaft 23, controlled by the pilot's aileron control 24. Movement of a like but independent valve plate 2 for opening and closing off discharge from nozzles 12 and 13, for prevention of stalling, is automatically effected by means such as the rod 21, operatively connected to a relay 25 (FIGURE 11) which is electrically connected to a pair of normally open contacts 26 which are closable by movement of a diaphragm 30 within a manometer 3. The diaphragm divides the manometer into two separate chambers 31 and 32. Chamber 31 is subject to ambient static pressure, being connected for example to the static pressure tube 41 of a pitot tube 4; chamber 32 is subject to total pressure, or at least, to ram pressure, being connected, in the arrangement shown, to the ram pressure tube 42 of the pitot tube, which actually measures the sum of ambient pressure plus ram pressure. When the ram pressure, or the total pressure, in chamber 32 of manometer 3 drops in relation to static pressure in chamber 31, that is, when the airplane approaches a speed of, say, 1.05 V min. (within 5% of its stalling speed), the diaphragm 30 moves in the sense to open contacts 26; this de-energizes relay 25 which has held the valves 2 open, and allows them to move to or towards closed position under the influence of spring force, or otherwise. Closure of valves 2 cuts off the BLC air. A rheostat or the like could be moved by diaphragm 30, or the relative shapes of the duct ports and valve apertures could be such as to give graduated closing movement of the valves. This gradual decrease of lift will cause the airplane to nose down but slightly, and gradually.

It must be remembered that this invention is intended for use in a wing of a configuration that can best employ BLC, namely, a wing intended for high speeds, therefore not an airplane with straight wings but one having swept-back wings as defined hereinabove. In such swept wing airplanes the wing tips will usually lie primarily behind the airplane's center of gravity, and their aerodynamic effect, so far as pitching is concerned, is to cause the airplane to nose down. The wing root panels, however, lie mostly ahead of the C.G. in such an airplane, and in normal flight balance the nose down tendency of the wing tip panels. If, then, the wing tends to nose up, towards a stall attitude, and if that action produces a signal, as it would in the pitot tube 4, that acts to produce a lessening of lift over the two wing root panels, the nose down effect of the wing tip panels, over which there is no lessening of lift, predominates, and the effect is to cause the airplane to nose down. Since cessation or decrease of BLC in the wing root panels only is affected by decrease of air speed, as stalling is approached, and this cessation or decrease of BLC produces lessened lift in these wing root panels, it becomes clear that by this invention there is provided an automatic (or manual if desired) means to decrease the airplane's angle of attack below critical air speeds, and so to prevent its stalling.

The arrangement can be such as will progressively cut out the BLC with increase in the angle of attack at airspeeds which are low enough to create the danger of stalling, such progressive controls being themselves known and suggested above. The BLC over the wing tip panels 90a may be affected at the same time as that over the inboard panels 90b if roll control is required at such time, but preferably the two are controlled at different times, and that over inboard wing panels 90b automatically and that over wing tip panels 90a by the aileron control 24. The mechanism described is simplified, and may in practice be appreciably more complex; for example, it may include valves for cutting in or out air bled from the compressor sections of one or several engines. With such details the present invention is not concerned.

The invention has been described as functioning by blowing BLC air from ducts in the leading edge aft over airfoil surfaces. It might function equally well by sucking air from the trailing edge area or the leading edge area, these sucking operations being known equivalents to blowing operations. Either such arrangement is to be understood herein. Again, instead of decreasing BLC air flow over the wing root panels, it might be increased over the wing tip panels, or the BLC flow over the two types of panels might be varied each in relation to the other.

I claim as my invention:

1. In an airplane, a sustaining swept-back wing wherein the wing root panels are disposed largely ahead of the airplane's CG, and the wing tip panels are disposed largely behind the same, means operable during normal flight to effect movement of BLC air over the wing in a manner to produce lift generally balanced as between the wing root panels and the wing tip panels, with the airplane's center of lift in the vicinity of its CG, and means operable, when the airspeed decreases to a value approaching a stall, to adjust the BLC air over the wing root panels and over the wing tip panels relatively, to preclude shift of the center of lift forwardly and thereby to cause the airplane to nose up.

2. The combination of claim 1, including means sensitive to decrease of airspeed, and an operative connection between said latter means and the BLC adjusting means, to move the BLC-adjusting means automatically to a decreasing position upon decrease of airspeed to approach a stall.

3. In an airplane, a sustaining swept-back wing wherein the wing root panels are disposed largely ahead of the airplane's CG, and the wing tip panels are disposed largely behind the same, means operable during normal flight to effect movement of BLC air over at least the wing root panels to increase the lift of the airplane ahead of its CG, and means operable when the air speed decreases to a value approaching a stall, to decrease the BLC air flow over the wing root panels, and thereby to shift the center of lift rearwardly, to lessen the wing's angle of attack.

4. In an airplane as defined in claim 3, means operable during normal flight to effect movement of BLC air over the wing tip panels also, to increase the lift thereof to a value to balance the increased lift of the wing root panels, and so to locate the center of lift substantially at the CG, for normal flight, and means, separate from that for controlling BLC air flow over the wing root panels, for controlling BLC air flow over the wing tip panels, whereby a nosing-up tendency at or near stall can be countered by continuing BLC air flow over the wing tip panels and decreasing such air flow over the wing root panels.

(References on following page)

References Cited in the file of this patent

UNITED STATES PATENTS

| | | |
|---|---|---|
| 2,137,942 | Koster | Nov. 22, 1938 |
| 2,176,817 | Jacobson | Oct. 17, 1939 |
| 2,298,040 | Davis | Oct. 6, 1942 |
| 2,709,052 | Berg | May 24, 1955 |
| 2,886,264 | Seager | May 12, 1959 |

FOREIGN PATENTS

| | | |
|---|---|---|
| 702,926 | Germany | Feb. 24, 1941 |

OTHER REFERENCES

Pages 9 and 269 of Dictionary of Aeronautical Engineering, by J. L. Nayler, published 1959 by Philosophical Library, 15 E. 40th St., New York 16, N.Y.